United States Patent
Mannava et al.

(10) Patent No.: US 6,541,733 B1
(45) Date of Patent: Apr. 1, 2003

(54) LASER SHOCK PEENING INTEGRALLY BLADED ROTOR BLADE EDGES

(75) Inventors: Seetharamaiah Mannava, Cincinnati, OH (US); Jeffrey H. Nussbaum, Wilmington, MA (US); Abraham S. Assa, Marblehead, MA (US); Andrea G. M. Cox, Haverhill, MA (US); James R. Zisson, Salem, MA (US); Albert E. McDaniel, Cincinnati, OH (US); William D. Cowie, Xenia, OH (US)

(73) Assignee: General Electric Company, Schenectady, NY (US)

( * ) Notice: Subject to any disclaimer, the term of this patent is extended or adjusted under 35 U.S.C. 154(b) by 22 days.

(21) Appl. No.: 09/771,856

(22) Filed: Jan. 29, 2001

(51) Int. Cl.[7] .................................................. B23K 26/00
(52) U.S. Cl. ................................................. 219/121.85
(58) Field of Search ....................... 219/121.85, 121.68, 219/121.69, 121.73, 121.75; 148/525, 565

(56) References Cited

U.S. PATENT DOCUMENTS

| | | | |
|---|---|---|---|
| 5,067,876 A | | 11/1991 | Moreman, III |
| 5,492,447 A | | 2/1996 | Mannava et al. |
| 5,536,570 A | | 7/1996 | Mannava et al. |
| 5,591,009 A | | 1/1997 | Mannava et al. |
| 5,674,328 A | | 10/1997 | Mannava et al. |
| 5,674,329 A | | 10/1997 | Mannava et al. |
| 5,756,765 A | | 5/1998 | Mannava et al. |
| 5,911,890 A | | 6/1999 | Dulaney et al. |
| 5,932,120 A | | 8/1999 | Mannava et al. |
| 5,951,790 A | * | 9/1999 | Mannava et al. ............ 148/510 |
| 6,183,882 B1 | * | 2/2001 | Mannava et al. ............ 148/510 |
| 6,200,689 B1 | * | 3/2001 | Ferrigno et al. ............. 148/565 |
| 6,236,016 B1 | * | 5/2001 | Dulaney et al. ............ 148/525 |
| 6,296,448 B1 | * | 10/2001 | Suh et al. .................... 148/525 |

* cited by examiner

Primary Examiner—Tom Dunn
Assistant Examiner—Jonathan Johnson
(74) Attorney, Agent, or Firm—VG Ramaswamy; Steven Rosen

(57) ABSTRACT

A method for laser shock peening rotor blade leading and trailing edges of gas turbine engine integrally bladed rotors and disks that are not blocked by other rows of blades. The method includes continuously firing a stationary laser beam, which repeatable pulses between relatively constant periods, along at least a portion of leading or trailing edges of the blade, with the laser beam aimed at an oblique angle with respect to a surface of the edge such that laser pulses form overlapping elliptical shaped laser spots. In the exemplary embodiment of the invention, the elliptical shaped laser spots have an overlap of about 50% and are on the order of 11.7 mm by 4 mm in diameter. Another method is for laser shock peening rotor blade leading and trailing edges of gas turbine engine integrally bladed rotors and disks that are blocked by other rows of blades. The method includes continuously firing the stationary laser beam, which repeatable pulses between relatively constant periods, along at least a portion of leading or trailing edges of the blade, with the laser beam compoundly angled such that it is aimed at a first oblique angle with respect to a surface of the edge and at a second oblique angle with respect to an axis about which the rotor is circumscribed. Laser pulses form the elliptical shaped laser spots that are angled from the leading edge radially inwardly towards the axis. In the exemplary embodiment, the elliptical shaped laser spots have an overlap of about 50%.

10 Claims, 12 Drawing Sheets

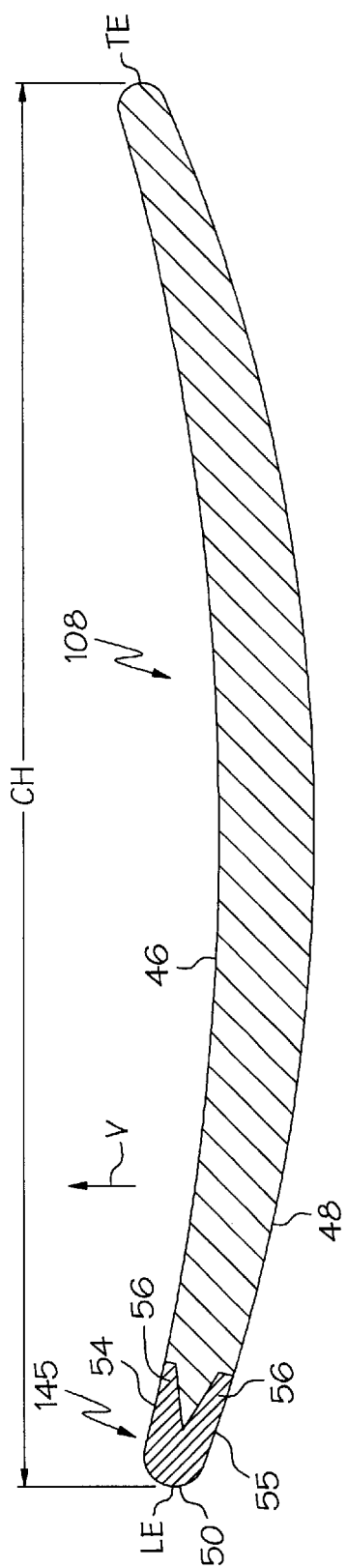
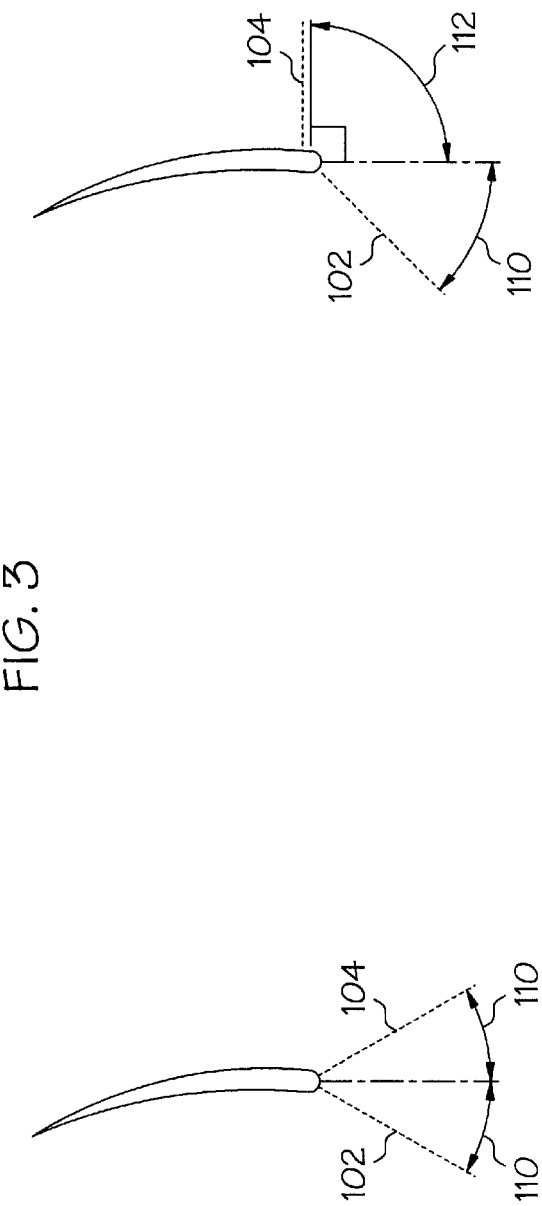
FIG. 3
FIG. 4
FIG. 6

LASER SHOCK PEENING INTEGRALLY BLADED ROTOR BLADE EDGES

BACKGROUND OF THE INVENTION

1. Field of the Invention

This invention relates to laser shock peening of leading and trailing edges of gas turbine engine blades and, more particularly, for laser shock peening airfoil leading and trailing edges of blades of integrally bladed rotors and disks such as found on fan and compressor blades to form laser shock peened regions having localized compressive residual stresses imparted by laser shock peening.

2. Discussion of the Background Art

Gas turbine engines and, in particular, aircraft gas turbine engines rotors operate at high rotational speeds that produce high tensile and vibratory stress fields within rotating blades, such as fan and compressor blades and makes blades susceptible to foreign object damage (FOD). Vibrations may also be caused by vane wakes and inlet pressure distortions as well as other aerodynamic phenomena. This FOD causes nicks and tears and hence stress concentrations in leading and trailing edges of blade airfoils. These nicks and tears become the source of high stress concentrations or stress risers and severely limit the life of these blades due to High Cycle Fatigue (HCF) from vibratory stresses. These and other operational phenomena lead to incipient cracking and material failure of portions of objects such as along airfoil edges.

Therefore, it is highly desirable to design and construct longer lasting fan and compressor blades, as well as other hard metallic parts, that are better able to resist both low and high cycle fatigue and that can arrest cracks than present day parts. The above referenced U.S. Patent Applications are directed towards this end. They teach to provide an airfoil of a blade with regions of deep compressive residual stresses imparted by laser shock peening on at least a radially extending portion of leading and/or trailing edge surfaces of the blade.

The region of deep compressive residual stresses imparted by laser shock peening of the present invention is not to be confused with a surface layer zone of a workpiece that contains locally bounded compressive residual stresses that are induced by a hardening operation using a laser beam to locally heat and, thereby, harden the workpiece such as that which is disclosed in U.S. Pat. No. 5,235,838, entitled "Method and apparatus for truing or straightening out of true work pieces". The prior art teaches the use of multiple radiation pulses from high powered pulsed lasers and large laser spot diameters of about 1 cm to produce shock waves on the surface of a workpiece similar to the above referenced Patent Applications and U.S. Pat. No. 3,850,698, entitled "Altering Material Properties"; U.S. Pat. No. 4,401,477, entitled "Laser shock processing"; and U.S. Pat. No. 5,131,957, entitled "Material Properties". Laser shock peening, as understood in the art and as used herein, means utilizing a laser beam from a laser source to produce a strong localized compressive force on a portion of a surface. Laser peening has been utilized to create a compressively stressed protection layer at the outer surface of a workpiece which is known to considerably increase the resistance of the workpiece to fatigue failure as disclosed in U.S. Pat. No. 4,937,421, entitled "Laser Peening System and Method".

Laser shock peening leading and trailing edges of gas turbine engine fan and compressor blades and stator airfoils have been disclosed in U.S. Pat. No. 5,591,009, entitled "Laser shock peened gas turbine engine fan blade edges"; U.S. Pat. No. 5,531,570, entitled "Distortion control for laser shock peened gas turbine engine compressor blade edges"; U.S. Pat. No. 5,492,447, entitled "Laser shock peened rotor components for turbomachinery"; U.S. Pat. No. 5,674,329, entitled "Adhesive tape covered laser shock peening"; and U.S. Pat. No. 5,674,328, entitled "Dry tape covered laser shock peening", all of which are assigned to the present Assignee. The laser shock peening methods disclosed in these patents include ways of laser shock peening airfoil leading and trailing edges using circular cross-sectional laser beams that form circular laser spots on the edges.

U.S. Pat. No. 5,492,447 discloses laser shock peening an interior annular region by orbiting a laser beam at an oblique angle to the interior surface of the interior annular region. U.S. Pat. No. 5,911,890 teaches controlling the incident angle of the laser beam applied to the workpiece and controlling the shape of the beam with lenses, polarizers, and particular transparent overlay geometries. The apparatus and methods disclosed includes use of structure for controlling the position and incident angle of the laser beam and controlling the polarization and/or the shape of the incident impact area, based on such incident angle. The patent teaches that an oblique incident angle laser beam having a circular cross-section causes the shape of the impact spot to be elliptical and that the consequences of such a change of the incident spot shape necessarily changes the energy density applied to the workpiece. The patent further teaches that the energy density per unit area compared to other areas on the same surface creates a possibility of non-uniformly working the material, thereby, possibly losing some of the benefits of laser shock peening. This non-uniformity of energy application to a workpiece may cause severe problems, particularly, when hitting a workpiece from opposite sides at the same time, as used with a split beam laser system. Such opposing hits are sometimes needed on workpieces of thin cross-section, such as disks, blades, and other workpieces of different geometries. In conventional split beam processing, there is a possible effect of not having the laser processed portions on the opposite sides of the workpiece worked identically, and at the same time when elliptical spots are utilized. Such non-uniform working of the workpiece may cause over or under working of the material or distortion of the workpieces, thereby, not achieving the goals of laser shock processing. Furthermore, based upon the oblique angle along with the particular transparent overlay material utilized, polarization issues regarding the reflection of the laser beam from the surface of the transparent overlay layer can possibly degrade and reduce the energy applied to the workpiece. Thus, in general, the patent concludes not to use elliptical laser spots but rather a more complicated apparatus and method to significantly reduce the non-uniformity of the applied energy to a workpiece by modifying the shape of the applied laser energy pulse. The patent teaches to pass the pulse of energy through a lens to reform the shape of the incident area on the workpiece, to counteract geometric effects created by the workpiece surface orientation on the incident area shape.

Manufacturers are constantly seeking methods to reduce the time, cost, and complexity of laser shock peening processes and, it is to this end that the present invention is directed and, more particularly, to avoid the use of apparatuses and methods to reshape laser beams used in laser shock peening.

SUMMARY OF THE INVENTION

A first exemplary embodiment of the invention is a method for laser shock peening leading or trailing edges of gas turbine engine blades mounted on a rotor element by simultaneously laser shock peening pressure and suction side surfaces along one of the edges of the blade with circular cross-section laser beams, firing the laser beams, at an oblique angle with respect to the surfaces so as to form elliptical shaped laser spots on the surfaces, and overlapping adjacent elliptical shaped laser spots and firing the laser beams with sufficient energy to form regions having compressive residual stresses imparted by the laser shock peening extending into the blade from the surfaces. The elliptical shaped laser spots have major axis extending away from the edge and over the surfaces and transverse minor axis and, in a more particular embodiment of the invention, the elliptical shaped laser spots overlap by about 50% and the laser spots extend over the edge. Relative movement between the laser beams and the surfaces is effected while the laser beams are being fired.

A second exemplary embodiment of the invention is a method of laser shock peening leading or trailing edges of gas turbine engine blades mounted on a rotor element circumscribed about an axis of rotation and having an annular space between adjacent axially spaced apart forward and aft and rows of blades. This method laser shock peens leading or trailing edges that border the space by simultaneously laser shock peening pressure and suction side surfaces along one of the edges of the blades in one of the rows with circular cross-section laser beams, firing the laser beams at a first oblique angle with respect to the surfaces so as to form elliptical shaped laser spots on the surfaces and at a second oblique angle with respect to the axis wherein the second oblique angle is sufficient to clear blades in the adjacent row of blades, and overlapping adjacent elliptical shaped laser spots and firing the laser beams with sufficient energy to form regions having compressive residual stresses imparted by the laser shock peening extending into the blade from the surfaces.

A third exemplary embodiment of the invention is a method of laser shock peening leading or trailing edges of gas turbine engine blades mounted on a rotor element by simultaneously laser shock peening pressure and suction side surfaces along one of the edges of the blade with circular cross-section first and second laser beams respectively, firing the first laser beam at an oblique angle with respect to the pressure side surface so as to form elliptical shaped laser spots on the pressure side surface, firing the second first laser beam at about a normal angle with respect to the suction side surface so as to form circular shaped laser spots on the suction side surface, and overlapping adjacent elliptical shaped laser spots and circular shaped laser spots respectively and firing the laser beams with sufficient energy to form regions having compressive residual stresses imparted by the laser shock peening extending into the blade from the surfaces.

A fourth exemplary embodiment of the invention is a method of laser shock peening leading or trailing edges of gas turbine engine blades mounted on a rotor element circumscribed about an axis of rotation and having an annular space between adjacent axially spaced apart forward and aft rows of blades, wherein the edges being laser shock peened border the space. This method laser shock peens leading or trailing edges that border the space by simultaneously laser shock peening pressure and suction side surfaces along one of the edges of the blades in one of the rows with circular cross-section laser beams, firing the first laser beam at a first oblique angle with respect to the pressure side surface so as to form elliptical shaped laser spots on the pressure side surface and at a second oblique angle with respect the axis wherein the second oblique angle is sufficient to clear blades in the adjacent row of blades, firing the second first laser beam at about a normal angle with respect to the suction side surface so as to form circular shaped laser spots on the suction side surface and at a second oblique angle with respect the axis wherein the second oblique angle is sufficient to clear blades in the adjacent row of blades, and overlapping adjacent elliptical shaped laser spots and firing the laser beams with sufficient energy to form regions having compressive residual stresses imparted by the laser shock peening extending into the blade from the surfaces.

The present invention is a faster and more cost efficient method to laser shock peen surface portions of leading and trailing edges gas turbine engine blades mounted on rotor sections or elements. An integrally formed bladed rotor section is also referred to as an integrally bladed rotor (IBR) or integrally bladed disk (BLISK) having two or more spaced apart rows of blades integrally mounted or formed on a drum rotor or disk respectively. The blades are designed to operate in high tensile and vibratory stress fields and laser shock peening enables the blades to better withstand fatigue failure due to nicks and tears in the leading and trailing edges of the blades and, therefore, have an increased life over conventionally constructed blades. A laser shock peening production line may be set up and operated less expensively compared to those suggested in the prior art, due to lower capital outlay. The line should be less complex to develop, design, and construct because the method for the present invention uses direct laser beams without intervening lenses for laser beam shaping.

BRIEF DESCRIPTION OF THE DRAWINGS

The foregoing aspects and other features of the invention are explained in the following description, taken in connection with the accompanying drawings where:

FIG. 3 is a cross-sectional view illustration of the laser shock peened compressor blade through 3—3 in FIG. 2.

FIG. 4 is a cross-sectional diagrammatic illustration of the laser shock peening method in FIG. 1 through 3—3 of the blade in FIG. 2.

FIG. 6 is a cross-sectional diagrammatic illustration of the second method illustrated in FIG. 5 through 3—3 in FIG. 2.

DETAILED DESCRIPTION

Figure 1:
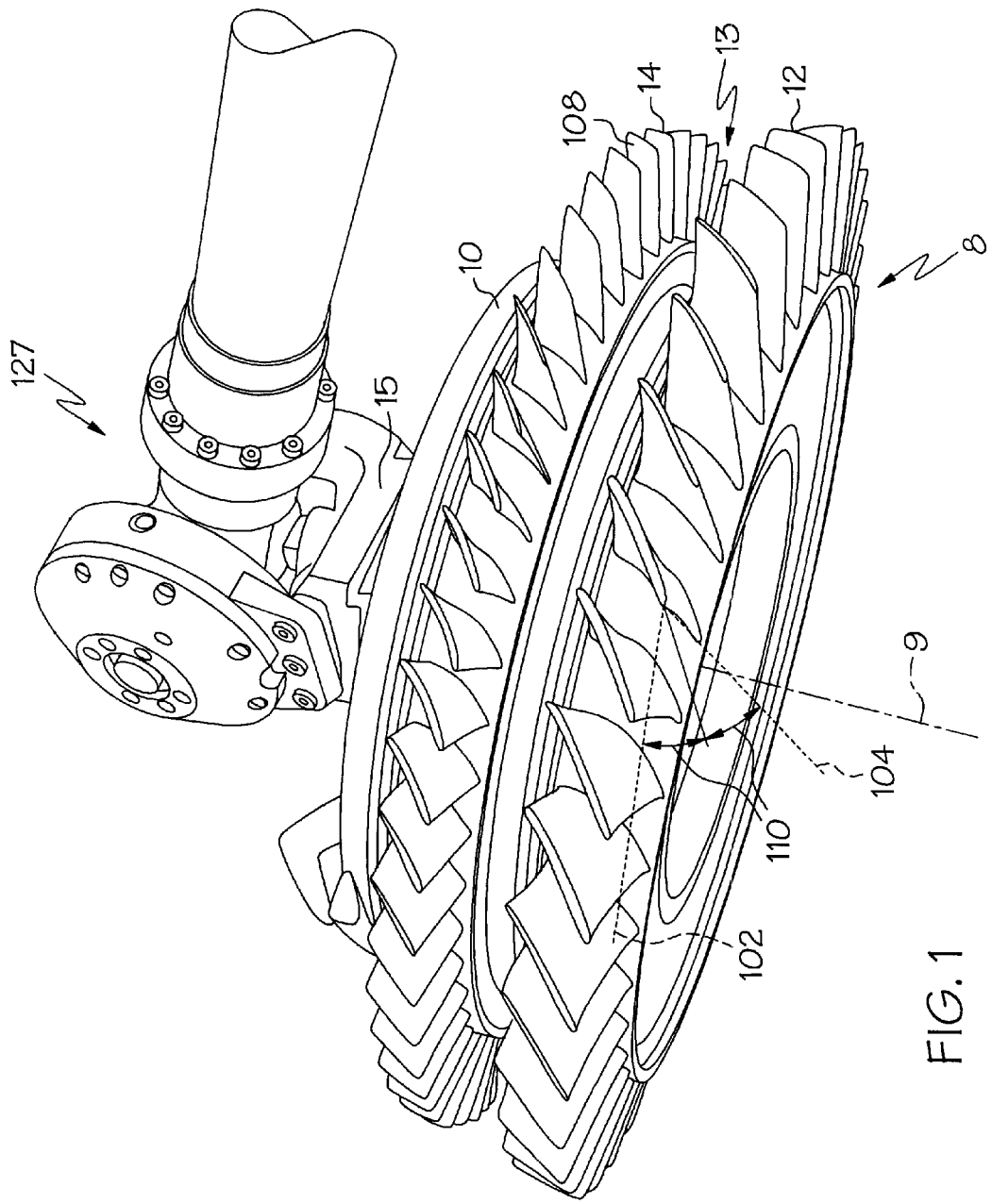
FIG. 1 is a diagrammatic perspective view illustration of an exemplary first method of laser shock peening first stage compressor blades of an aircraft gas turbine engine BLISK.
Figure 5:
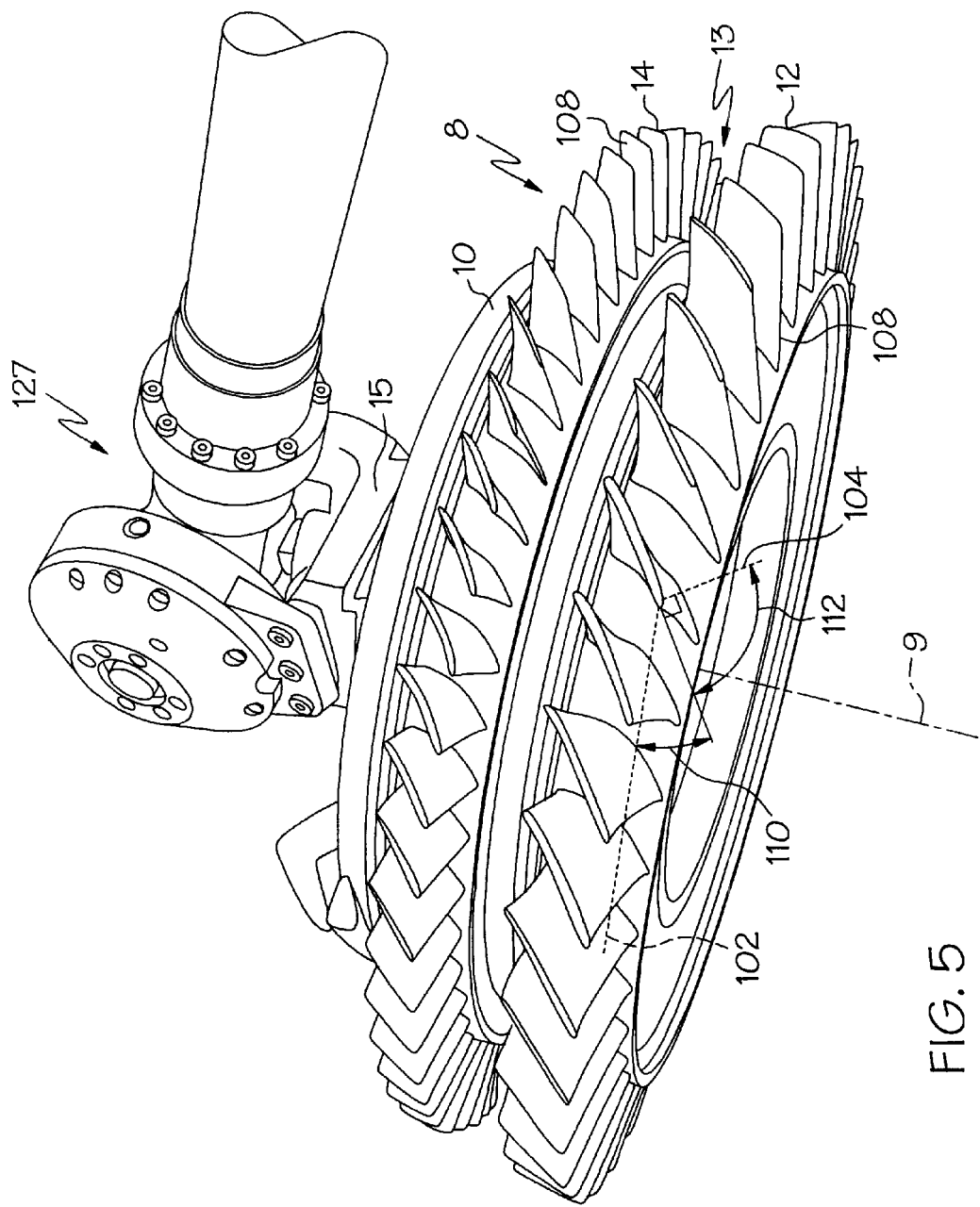
FIG. 5 is an alternative second method of laser shock peening the first stage blades which includes laser shock peening a suction side of the blade with circular laser spots.
Figure 7:
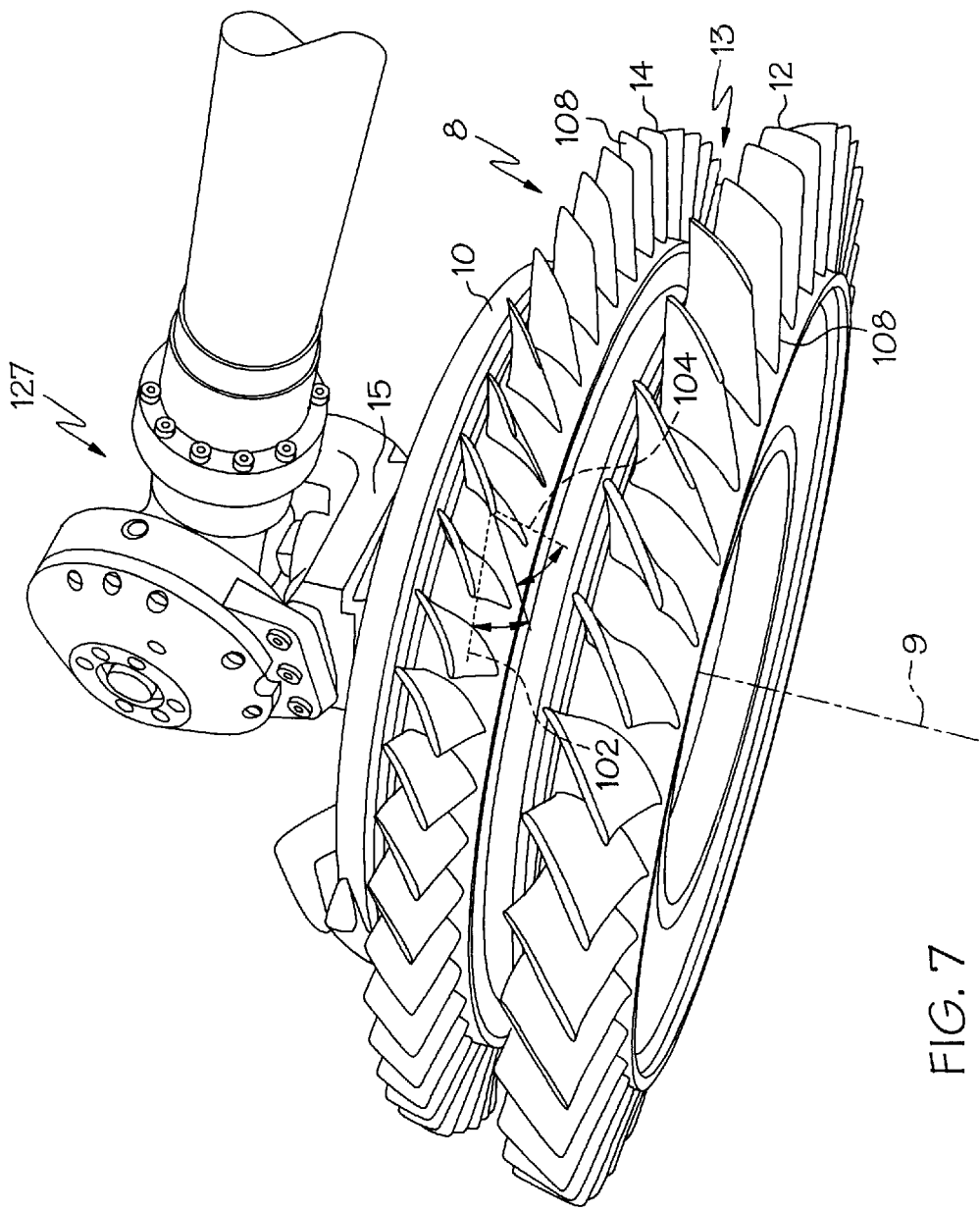
FIG. 7 is a diagrammatic perspective view illustration of laser shock peening a leading edge of second stage blades with a third method for laser shock peening a suction side of the blade with circular laser spots.

Illustrated in FIG. 1 is a bladed rotor section 8 having an axis of rotation 9 which coincides with a centerline of the engine about exemplified by an integrally bladed disk (BLISK) 10 having axially spaced apart circumferential forward and aft rows 12 and 14, respectively, (also referred to as first and second stages) of compressor blades 108. An annular space 13 extends between the axially adjacent spaced apart forward and aft rows 12 and 14 of the blades 108. For the purposes of this patent, the BLISK 10 is representative of integrally bladed rotor elements and the blades 108 are representative of blades which extend radially outward from the BLISK 10. The BLISK is illustrated in FIGS. 1, 5, and 7 mounted in a fixture 15 which is attached to a six-axis computer numerically controlled (CNC) manipulator 127. The manipulator 127 is part of a laser shock peening apparatus and system 101 which is illustrated more particularly in FIG. 14. The invention is applicable to rotor blades including fan and turbine blades as well as compressor blades.

Figure 2:
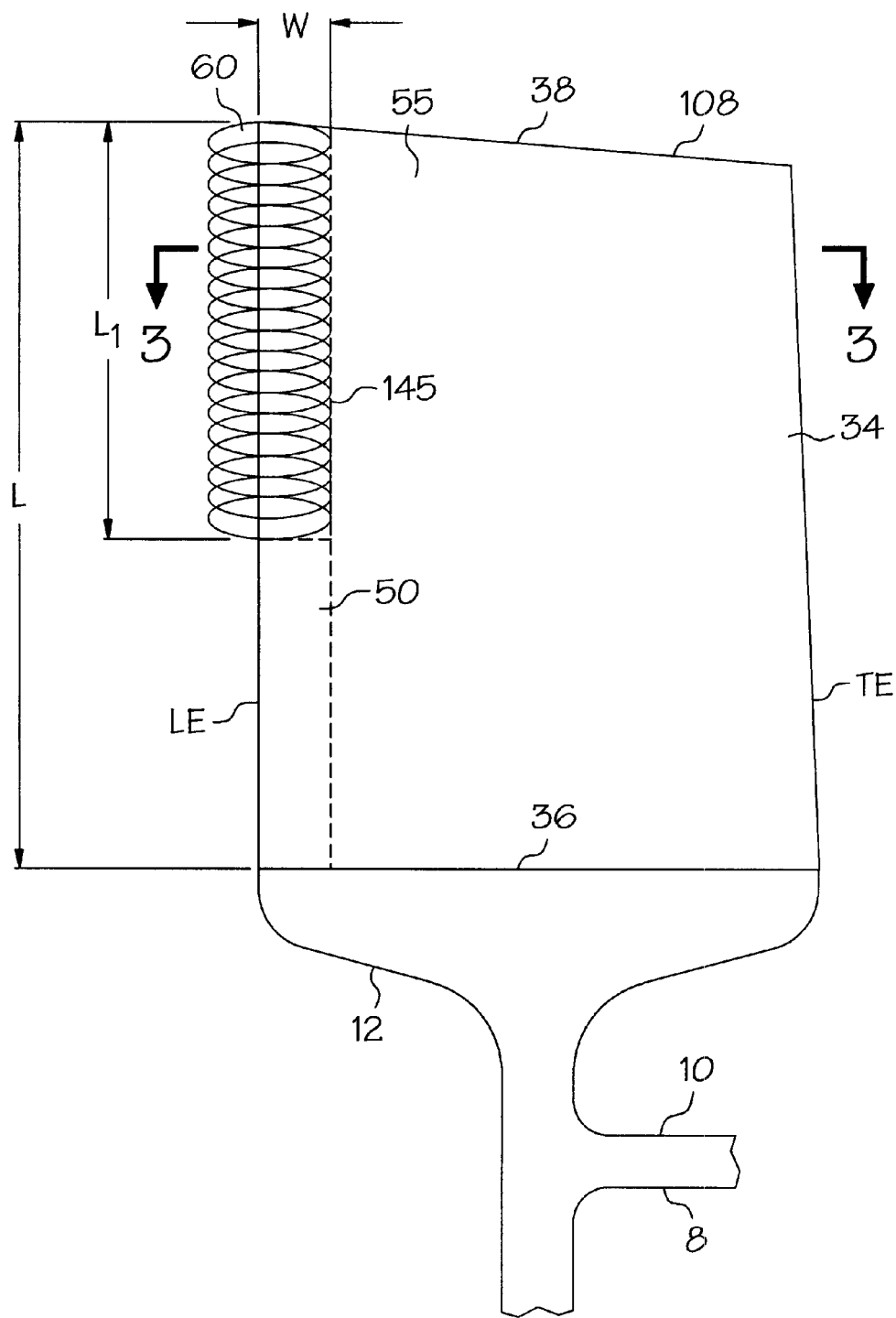
FIG. 2 is a diagrammatic side view illustration of a pattern of elliptical laser spots used in the laser shock peening along a radially extending leading edge of a first stage blade in the BLISK illustrated in FIG. 1.

Referring to FIGS. 2 and 3, each compressor blade 108 has an airfoil 34 extending in the chordwise direction between a leading edge LE and a trailing edge TE of the airfoil. A chord CH of the airfoil 34 is the line between the leading LE and trailing edge TE at each cross-section of the blade as illustrated in FIG. 3. Pressure and suction sides 46 and 48, respectively, of the airfoil 34 extend between the leading edge and trailing edges LE and TE of the airfoil. The pressure side 46 faces in the general direction of rotation as indicated by arrow V and the suction side 48 is on the other side of the airfoil.

The blade 108 has a leading edge section 50 that extends along the leading edge LE of the airfoil 34 from a base 36 of the airfoil to a tip 38 of the airfoil. The leading edge section 50 has a width W such that the leading edge section 50 encompasses nicks and tears that may occur along the leading edge of the airfoil 34.

The airfoil 34 subject to a significant tensile stress field due to centrifugal forces generated by the blade 108 rotating during engine operation. The airfoil 34 is also subject to vibrations generated during engine operation and the nicks and tears operate as high cycle fatigue stress risers producing additional stress concentrations around them.

To counter fatigue failure of portions of the blade along possible crack lines that can develop and emanate from the nicks and tears at least one of or, as in the exemplary embodiments of the invention illustrated herein, a laser shock peened patch 145 is placed along a portion of the leading edge LE where the incipient nicks and tears may cause a failure of the blade due to high cycle fatigue. In the exemplary embodiment, the patch 145 extends radially inwardly from the tip 38 a portion L1 of a length L of the leading edge LE. The pressure side 46 and the suction side 48 have pressure side and suction side surfaces 54 and 55, respectively, within the laser shock peened patch 145 which are laser shock peened using the method of the present invention. Pre-stressed regions 56 having deep compressive residual stresses imparted by the laser shock peening (LSP) method of the present invention extend radially inwardly from the pressure side and the suction side surfaces 54 and 55 when they are laser shock peened. The pre-stressed regions are illustrated along only a portion of the leading edge section 50 but may extend along the entire length L of the leading edge LE or longer portion thereof if so desired.

Illustrated in FIGS. 1, 2, and 4 is an exemplary embodiment of a first method, of the invention, for laser shock peening the leading edge LE or the trailing edge TE of the gas turbine engine blades 108 mounted on a rotor element illustrated as the BLISK. The method is illustrated for the leading edges LE of the forward row 12 of the compressor blades 108 and is applicable to the trailing edges TE of the aft row 14 of the blades 108. The method includes simultaneously laser shock peening the pressure and suction side surfaces 54 and 55 within the laser shock peened patch 145 along one of the leading and trailing edges LE and TE of the blade 108 with circular cross-section first and second laser beams 102 and 104 respectively, firing the laser beams at a first oblique angles 110 with respect to the pressure and suction side surfaces 54 and 55 so as to form elliptical shaped laser spots 60 on the pressure and suction side surfaces, overlapping adjacent the elliptical shaped laser spots 60, and firing the laser beams with sufficient energy to form regions having compressive residual stresses imparted by the laser shock peening extending into the blade 108 from the pressure and suction side surfaces.

In the exemplary embodiment of the invention, overlapping adjacent ones of the elliptical shaped laser spots 60 are formed in different linear passes of the first and second laser beams 102 and 104 over the pressure and suction side surfaces 54 and 55 such that every other elliptical shaped laser spot 60 is laser shock peened in the same pass. This is illustrated in FIG. 11 in which the elliptical shaped laser spots 60 formed in a first pass 61 and the elliptical shaped laser spots 60 formed in a second pass 62 are so indicated by appropriate and corresponding numerals in the FIGS. Each of the elliptical shaped laser spots 60 have major axis 64 extending away from the leading or trailing edges LE and TE over the pressure side and suction side surfaces 54 and 55 within the laser shock peened patch 145 and transverse minor axis 66.

Figure 11:
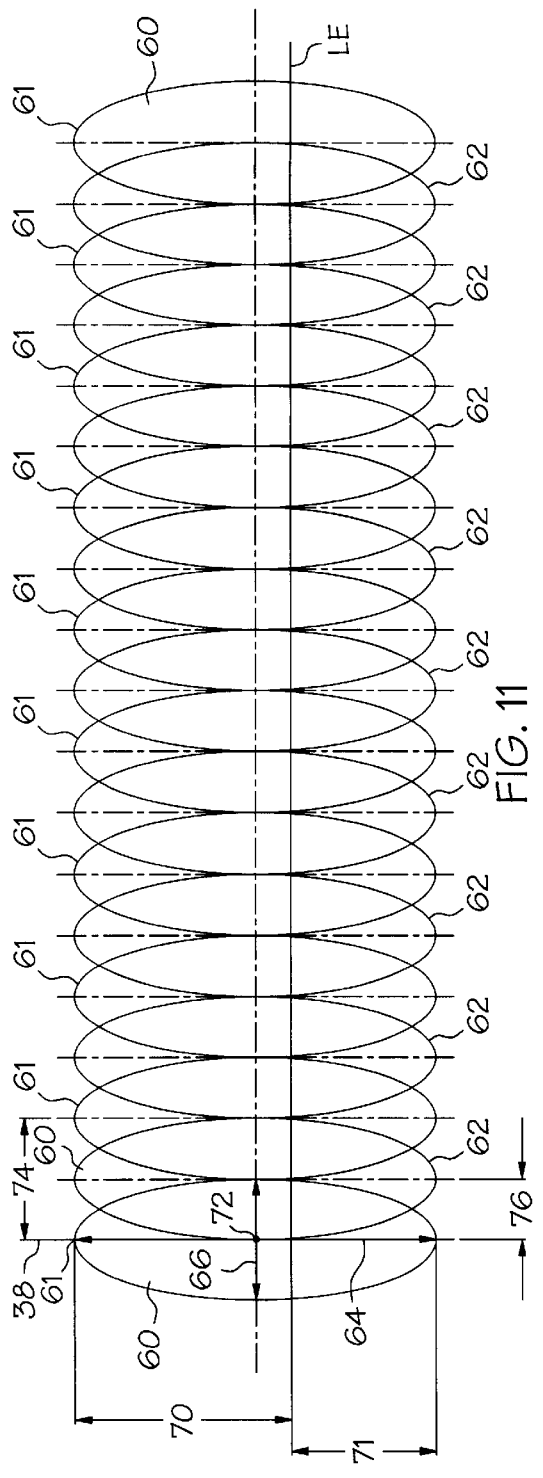
FIG. 11 is a diagrammatic side view illustration of a pattern of elliptical laser spots used in the first, second, and third laser shock peening methods for the pressure side of the blade.

In a more particular embodiment of the invention, the elliptical shaped laser spots 60 formed in the first pass 61 overlap adjacent spots formed in the second pass 62 by about 50% with respect to their minor axes 66 as illustrated in FIG. 11 (i.e. the minor axes overlap by 50%) and the laser spots formed in the same pass are close to each other and may touch but substantially do not overlap. The elliptical shaped laser spots 60 extend in front or over the leading edge LE (or in back of or over the trailing edge TE). Relative movement between the first and second laser beams 102 and 104 and the pressure and suction sides 46 and 48 is effected while the laser beams are being fired.

Illustrated in FIG. 11 is an example of dimensions used in one example of the first method is as follows. The elliptical shaped laser spots 60 have the major axis 64 equal to 11.9 mm, the minor axis 66 equal to 4 mm, and they extend a first distance 70 equal to 6.4 mm away from the leading or trailing edges LE and TE over the pressure side and suction side surfaces 54 and 55 within the laser shock peened patch 145 and a second distance 71 equal to 5.3 mm in front or over the leading edge LE. All the elliptical shaped laser spots 60 have centerpoints 72 at the intersection of the major axis 64 and the minor axis 66. The centerpoints 72 of the elliptical shaped laser spots 60 formed in the first pass 61 or the second pass 62 are a full minor axis apart which is a third distance 74 equal to 4 mm. The centerpoints 72 of the elliptical shaped laser spots 60 formed in the first pass 61 are spaced apart from those formed in the second pass 62 a fourth distance 76 equal to 2 mm or 50% of the minor axis providing the 50% overlap discussed above.

Figure 12:
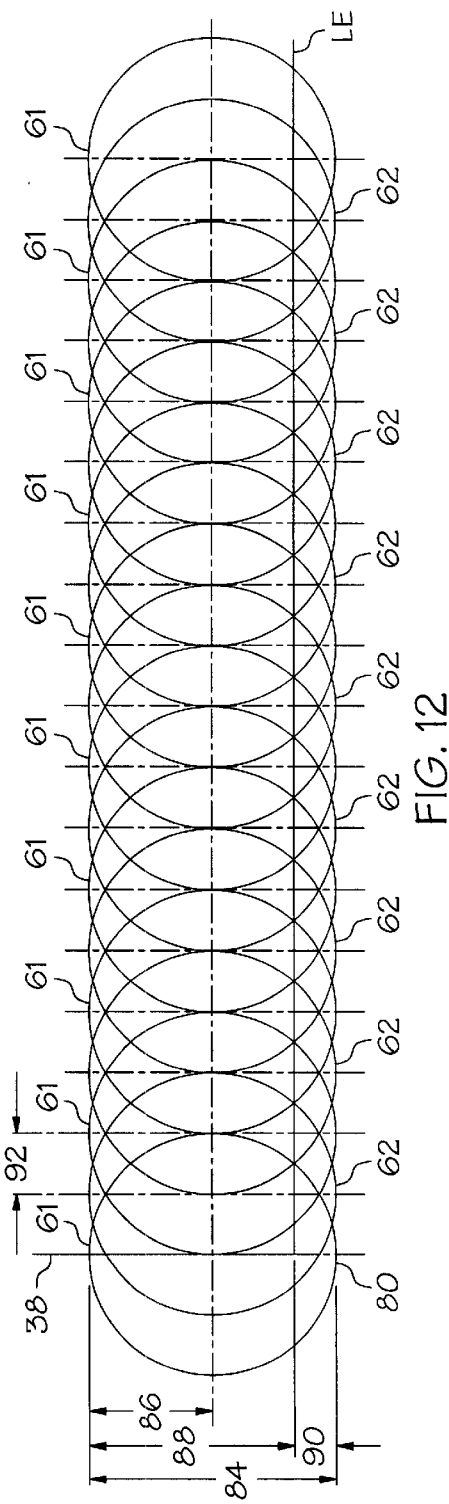
FIG. 12 is a diagrammatic side view illustration of a pattern of circular laser pots used in the second and fourth laser shock peening methods for the suction side of the blade.

Illustrated in FIGS. 5, 6, and 12 is an exemplary embodiment of a second method of the invention for laser shock peening the leading edge LE or the trailing edge TE of the gas turbine engine blades 108 mounted on a rotor element illustrated as the BLISK. The method is illustrated for the leading edges LE of the forward row 12 of the compressor blades 108 and is applicable to the trailing edges TE of the aft row 14 of the blades 108. The second method includes simultaneously laser shock peening the pressure and suction side surfaces 54 and 55 within the laser shock peened patch 145 along one of the leading and trailing edges LE and TE of the blade 108 with the circular cross-section first and second laser beams 102 and 104. The first laser beam 102 is fired at the first oblique angle 110 with respect to the pressure side surface 54 so as to form the elliptical shaped laser spots 60 on the pressure side surfaces. The second laser beams 104 is fired at the suction side surface 55 at a substantially right angle 112 so as to form circular shaped laser spots 80 on the suction side surface. The laser beams are fired in two or more passes such that every other elliptical shaped laser spot 60 and every other circular shaped laser spots 80 are laser shock peened in the same pass. The laser beams are fired with sufficient energy to form regions 56 (see FIG. 3) having compressive residual stresses imparted by the laser shock peening extending into the blade 108 from the pressure and suction side surfaces 54 and 55. The elliptical shaped laser spots 60 on the pressure side surfaces in the second method is substantially the same as those illustrated for the first method.

Illustrated in FIG. 12 is an exemplary embodiment of a second method of the invention for laser shock peening the leading edge LE or the trailing edge TE of the gas turbine engine blades 108 mounted on a rotor element illustrated as the BLISK. The second method is illustrated for the leading edges LE of the forward row 12 of the compressor blades 108 and is applicable to the trailing edges TE of the aft row 14 of the blades 108. The second method includes simultaneously laser shock peening the pressure and suction side surfaces 54 and 55 within the laser shock peened patch 145 along one of the leading and trailing edges LE and TE of the blade 108 with the circular cross-section laser beams. The first laser beam 102 is fired at the first oblique angle 110 with respect to the pressure side surface 54 so as to form the elliptical shaped laser spots 60 on the pressure side surface. The second laser beam 104 is fired at the suction side surface 55 at a substantially right angle 112 so as to form circular shaped laser spots 80 on the suction side surface. The laser beams are fired in two or more passes such that adjacent ones of the elliptical shaped laser spots 60 overlap and adjacent ones of the circular shaped laser spots 80 overlap. The first and second laser beams 102 and 104 are fired with sufficient energy to form regions 56 (see FIG. 3) having compressive residual stresses imparted by the laser shock peening extending into the blade 108 from the pressure and suction side surfaces 54 and 55. The elliptical shaped laser spots 60 on the pressure side surfaces in the second method is substantially the same as those illustrated for the first method.

Illustrated in FIG. 12 are dimensions and arrangement of the passes for the circular shaped laser spots 80 formed on the suction side surface 55. The circular shaped laser spots 80 have diameters 84 equal to 8 mm and radii 86 equal to 4 mm. The circular shaped laser spots 80 extend a fifth distance 88 equal to 6.4 mm away from the leading or trailing edges LE and TE over the suction side surfaces 55 within the laser shock peened patch 145 and a sixth distance 90 equal to 1.6 mm in front or over the leading edge LE. The circular shaped laser spots 80 are formed in the first pass 61 or the second pass 62 along with corresponding ones of the elliptical shaped laser spots 60; The circular shaped laser spots 80 formed in the first pass 61 and the circular shaped laser spots 80 formed in the second pass 62 overlap adjacent laser spots 80 by seventh distance 92 equal to 2 mm or 50% of the radii 86.

Figure 8:
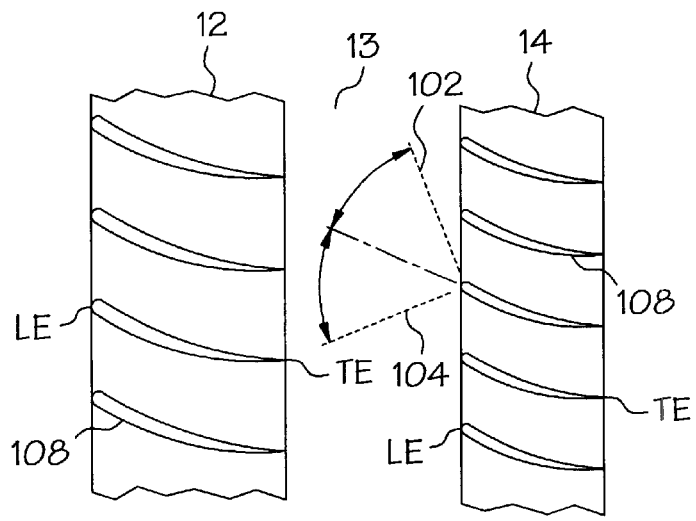
FIG. 8 is a cross-sectional diagrammatic illustration of the third method illustrated in FIG. 7 through 3—3 in FIG. 2.
Figure 9:
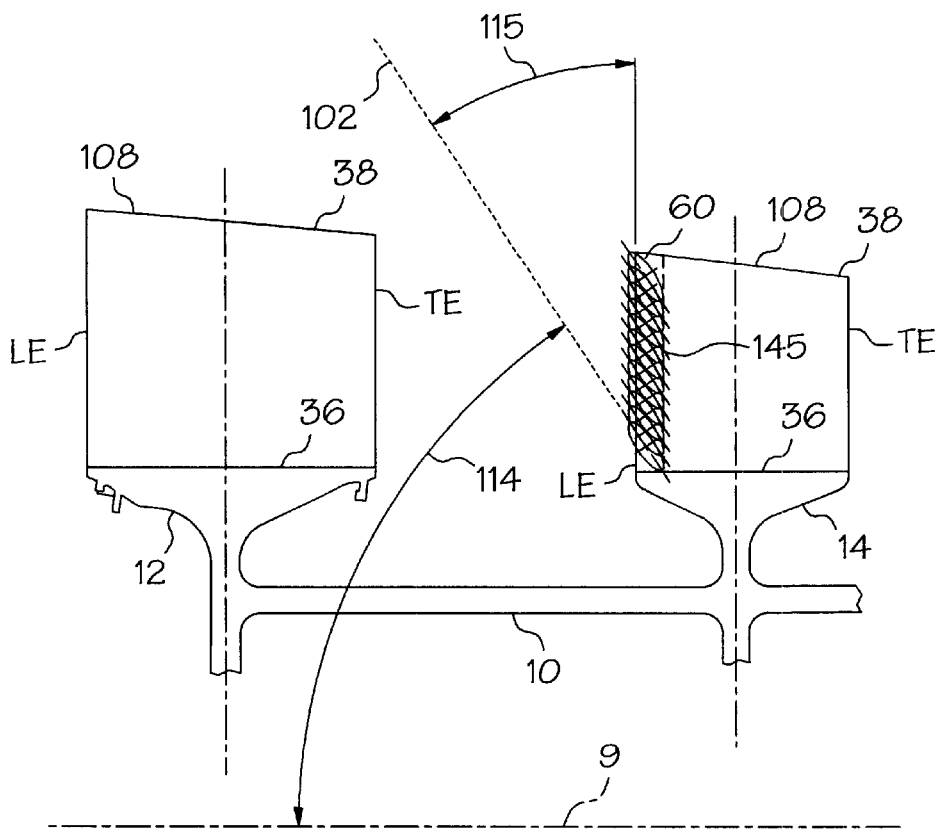
FIG. 9 is an axial cross-sectional diagrammatic illustration of the third method illustrated in FIG. 7.
Figure 10:
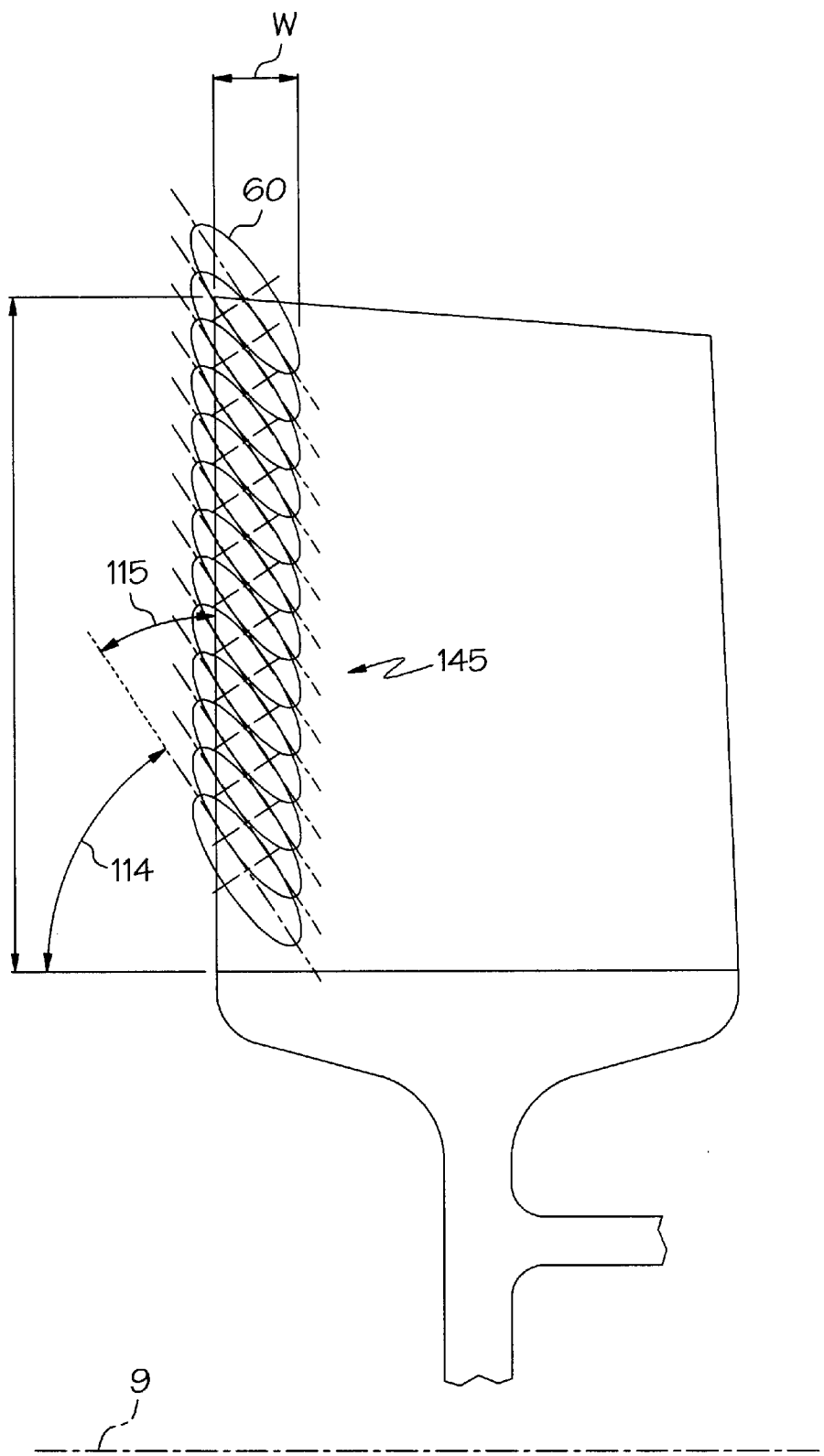
FIG. 10 is an enlarged diagrammatic side view illustration of the pattern of elliptical laser spots used in the third and in a fourth laser shock peening method illustrated herein.

Illustrated in FIGS. 7, 8, and 9 is an exemplary embodiment of a third method of the invention for laser shock peening the leading edge LE or the trailing edge TE of the gas turbine engine blades 108 mounted on a rotor element illustrated as the BLISK that adjoin or border the annular space 13. This incudes the trailing edges TE of the blades 108 in the forward row 12 and the leading edges LE of the blades 108 in the aft row 14. The method is illustrated for the leading edges LE of the forward row 12 of the compressor blades 108 in the aft row 14 of the blades 108. The method includes simultaneously laser shock peening the pressure and suction side surfaces 54 and 55 within the laser shock peened patch 145 along one of the leading and trailing edges LE and TE of the blade 108 with the first and second laser beams 102 and 104, firing the first and second laser beams at a first oblique angles 110 with respect to the pressure and suction side surfaces 54 and 55 at a second oblique angle 114 with respect to the axis of rotation 9 so as to form elliptical shaped laser spots 60 angled at a complimentary angle 115 (90 degrees minus the second oblique angle) to the leading edge LE on the pressure and suction side surfaces. The laser beams are fired so as to form overlapping adjacent ones of the elliptical shaped laser spots 60 and with sufficient energy to form regions having compressive residual stresses imparted by the laser shock peening extending into the blade 108 from the pressure and suction side surfaces. The laser beams are angled at the second oblique angle 114 with respect to the axis of rotation 9 to clear the tip 38 of the blades 108 in the adjacent row of blades.

As in the exemplary embodiments of method 1, overlapping adjacent ones of the elliptical shaped laser spots 60 is formed in different linear passes of the laser beams over the pressure and suction sides 46 and 48 such that the elliptical shaped laser spots 60 in each pass do not overlap as illustrated in FIG. 11 and explained above. The elliptical shaped laser spots 60 formed in a first pass 61 and the elliptical shaped laser spots 60 formed in a second pass 62 are so indicated by appropriate and corresponding numerals in the FIGS. Each of the elliptical shaped laser spots 60 have major axis 64 extending away from the leading or trailing edges LE and TE over the pressure side and suction side surfaces 54 and 55 within the laser shock peened patch 145 and transverse minor axis 66.

A fourth method of the invention is an alternative to the above disclosed third method for laser shock peening the leading edge LE or the trailing edge TE of the gas turbine engine blades 108 mounted on the rotor element illustrated as the BLISK that adjoin or border the annular space 13. The method is illustrated for the leading edges LE of the forward row 12 of the compressor blades 108 and is applicable to the trailing edges TE of the aft row 14 of the blades 108. The fourth method includes simultaneously laser shock peening the pressure and suction side surfaces 54 and 55 within the laser shock peened patch 145 along one of the leading and trailing edges LE and TE of the blade 108 with the first and second circular cross-section laser beams 102 and 104. The first laser beam 102 is fired at the first oblique angle 110 with respect to the pressure side surface 54 and at the second oblique angle 114 with respect to the axis of rotation 9 so as to form the elliptical shaped laser spots 60 angled at a complimentary angle 115 (90 degrees minus the second oblique angle) to the leading edge LE on the pressure side surface. The second laser beam 104 is fired at the suction side surface 55 at a substantially right angle 112 and normal to the suction side surface so as to form circular shaped laser spots 80 on the suction side surface.

Figure 13:
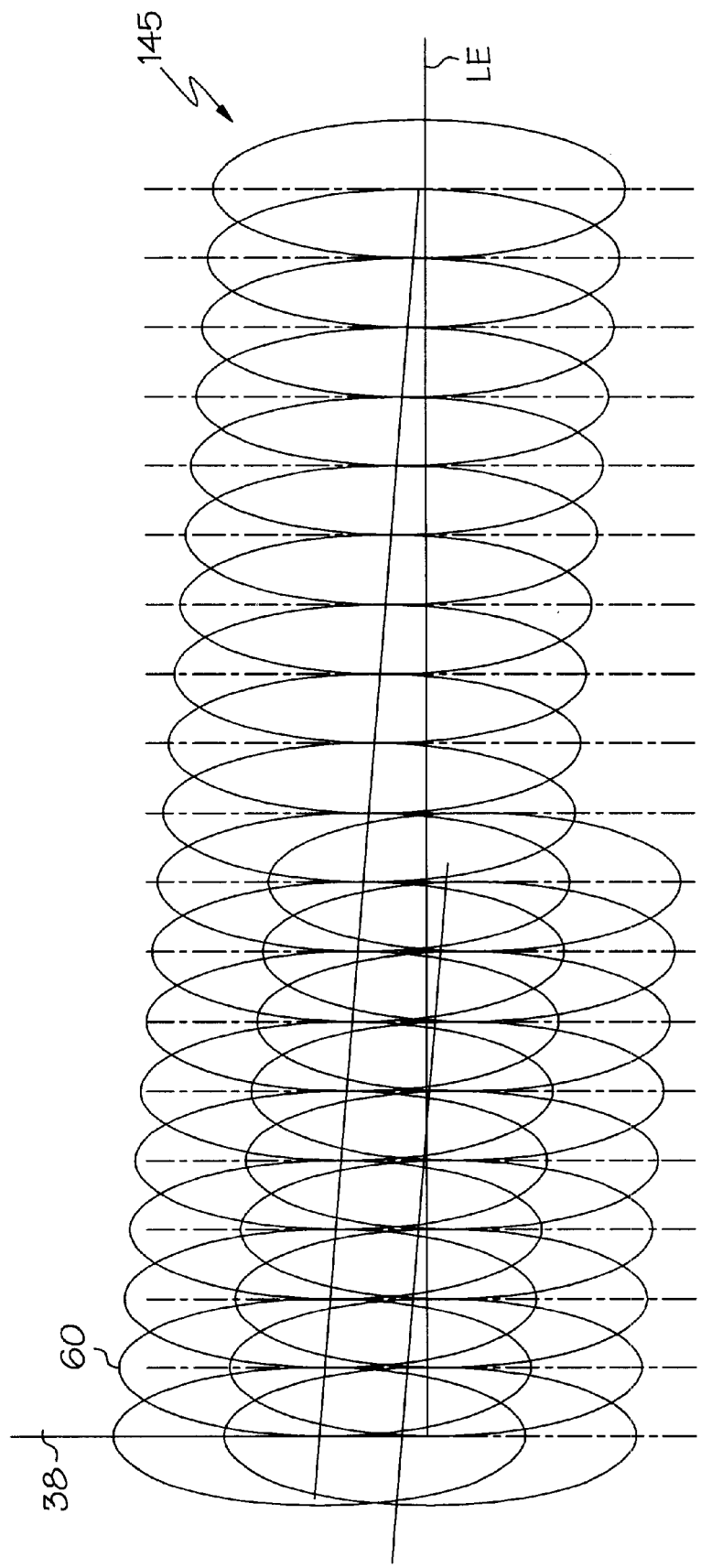
FIG. 13 is a diagrammatic side view illustration of an alternative pattern of linearly offset elliptical laser spots used in the laser shock peening along a radially extending edge of a the blade in the BLISK illustrated in FIG. 1.

A variation of the first through fourth methods is illustrated for the elliptical shaped laser spots 60 in FIG. 13 which is used when the blade 108 is angled or otherwise oriented such that a linear relative movement between the laser beams and the surfaces produces rows of laser spots that are linearly offset from or linearly aligned at an angle to the leading edge LE of the blade.

The second and third methods that use elliptical and circular shaped laser spots on the pressure and suction side surfaces, respectively, ideally should use spot dimensions and laser beam powers that balance the laser beam fluencies from side to side on the simultaneously formed elliptical and circular shaped laser spots as well as possible.

Figure 15:
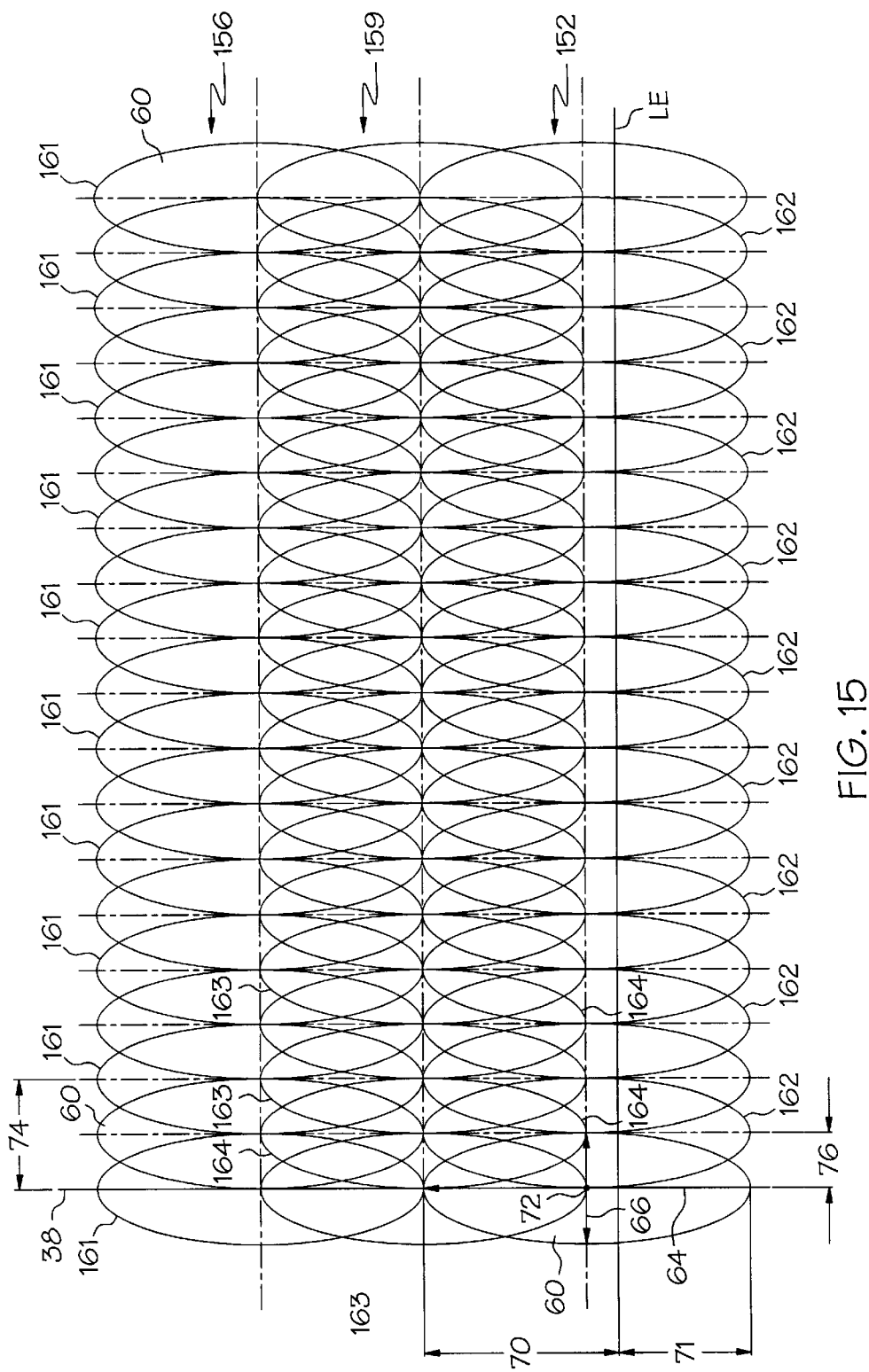
FIG. 15 is a diagrammatic side view illustration of a pattern of elliptical laser spots used in the laser shock peening along a radially extending leading edge of a first stage blade in the BLISK illustrated in FIG. 1.
Figure 16:
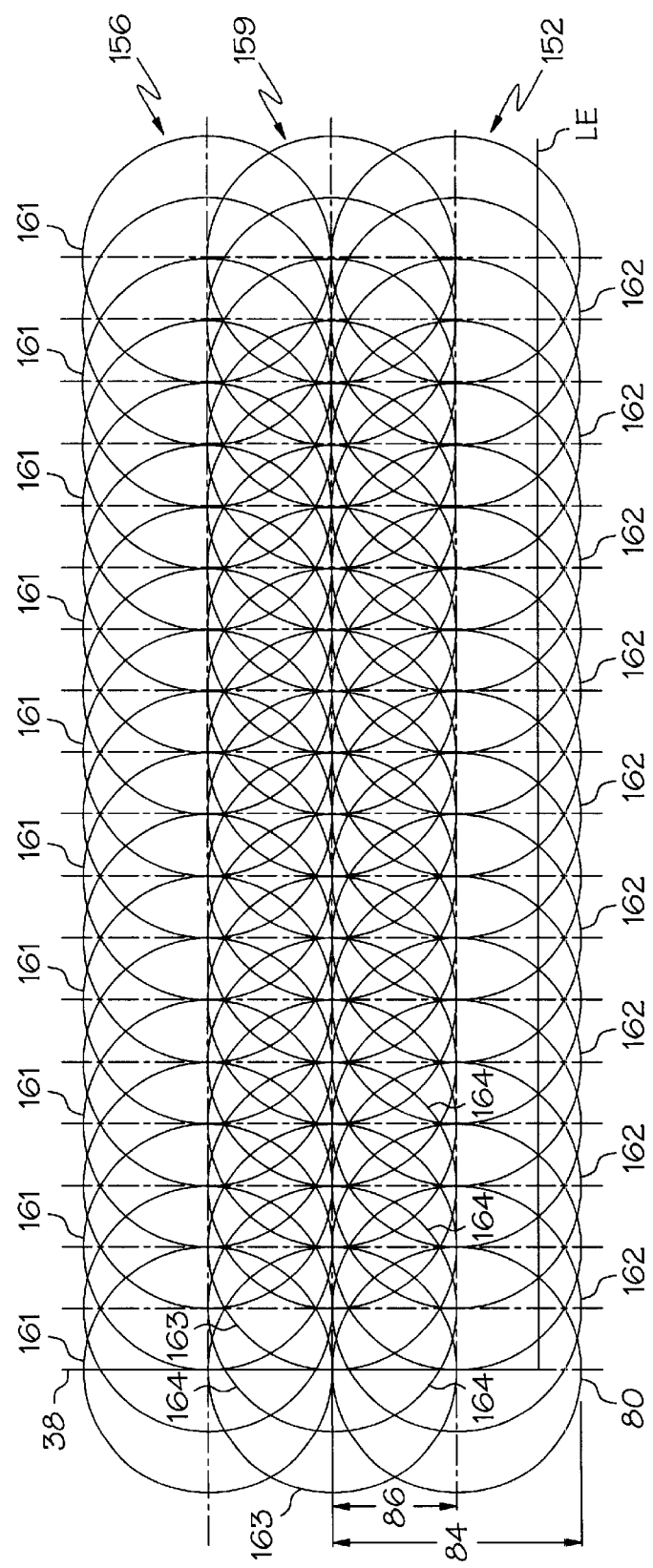
FIG. 16 is a diagrammatic side view illustration of a pattern of circular laser spots used in the laser shock peening along a radially extending leading edge of a first stage blade in the BLISK illustrated in FIG. 1.

Though only one row of either the elliptical shaped laser spots 60 or circular shaped laser spots 80 on each of the pressure side and suction side surfaces 54 and 55 have been discussed, two, three, or more axially overlapping rows may be used. First, second, and third overlapping rows 152, 154, and 156 respectively, of the elliptical shaped laser spots 60 and the circular shaped laser spots 80 are illustrated in FIGS. 15 and 16, respectively. The axially overlapping rows of laser spots should be formed in different sequences of linear passes with new ablative coatings applied between sequences. Therefore, the exemplary methods illustrated in FIGS. 15 and 16 use four sequences, first through fourth sequences 161, 162, 163, and 164, respectively, to laser shock peen the entire laser shock peened patch 145 with three overlapping rows of spots once such that every other elliptical shaped laser spot 60 and/or every other circular shaped laser spots 80 are laser shock peened in the same pass and overlapping rows are laser shock peened in different sequences. The pressure and suction side surfaces 54 and 55 are recoated with the ablative coating between sequences. The axially adjacent rows in one example overlap by 50% with respect to the major axis of the elliptically shaped laser spots and by 50% with respect to the radius of the circular shaped laser spots.

Figure 14:
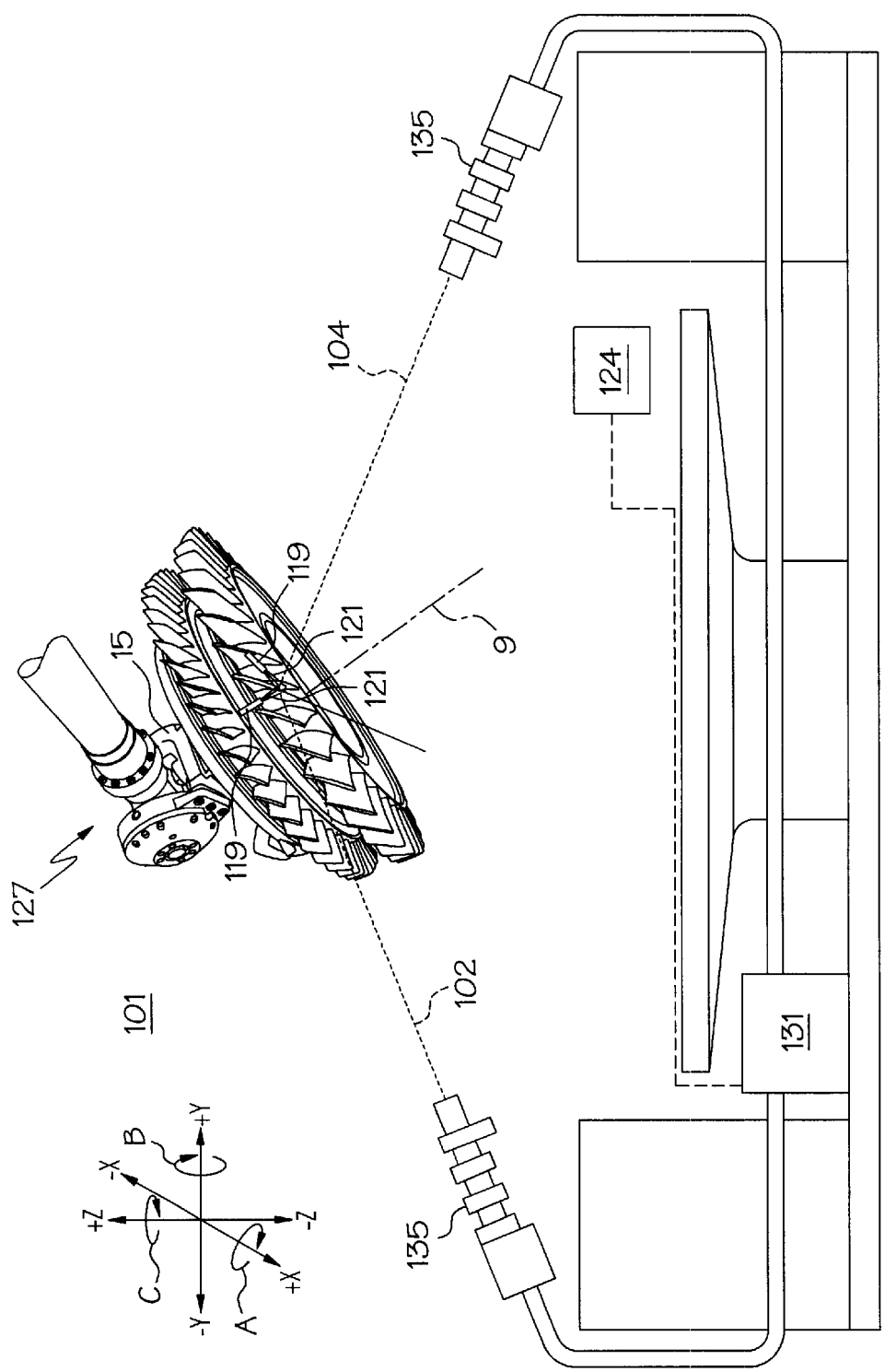
FIG. 14 is a perspective view illustration of first stage blades in the exemplary aircraft gas turbine engine BLISK being laser shock peened in a laser shock peening system.

Illustrated in FIG. 14 is the laser shock peening apparatus and system 101 for laser shock peening the compressor blade 108. The compressor blade 108 is mounted in the fixture 15 which is attached to the six-axis computer numerically controlled (CNC) manipulator 127. Six axes of motion illustrated in the exemplary embodiment are conventional X, Y, and Z translational axes labelled X, Y, Z respectively in the FIG. 14 and conventional A, B, and C rotational axes labelled A, B, and C respectively, all of which are well known in CNC machining. The manipulator 127 moves and positions the blades 108. The laser shock peening system 101 has a conventional laser beam generator 131 with an oscillator, a pre-amplifier, a beam splitter which feeds the pre-amplified laser beam into two beam optical transmission circuits each having a first and second amplifier, and optics 135 which include optical elements that transmit and focus the first and second laser beam 102 and 104 on the coated surfaces of the blade 108.

Before being laser shock peened to form the laser shock peened patch 145, the pressure and suction side surfaces 54 and 55 are coated with an ablative coating such as paint or adhesive tape to form coated surfaces as disclosed in U.S. Pat. Nos. 5,674,329 and 5,674,328. The coating provides an ablative medium preferably over which is a clear containment medium which may be a clear fluid curtain such as a curtain of flowing water 121. Between passes along the same row of the elliptical shaped laser spots 60, the pressure and suction side surfaces 54 and 55 are recoated such that there is always an ablative coating over the surface being laser shock peened.

The laser beam shock induced deep compressive residual stresses are produced by repetitively firing the high power first and second laser beams 102 and 104, each of which is defocused ± a few mils with respect to the coated pressure side and suction side surfaces 54 and 55 of the pressure side 46 and the suction side 48 of the compressor blade 108. Each of the laser beams is fired through the curtain of flowing water 121 supplied by a conventional water nozzle 119. The curtain of flowing water 121 is flowed over the coated surfaces. The coating is ablated generating plasma which results in shock waves on the surface of the material. Other ablative materials may be used to coat the surface as suitable alternatives to paint. These coating materials include metallic foil or adhesive plastic tape as disclosed in U.S. Pat. Nos. 5,674,329 and 5,674,328. These shock waves are redirected towards the coated surfaces by the curtain of flowing water 121 to generate travelling shock waves (pressure waves) in the material below the coated surfaces. The amplitude and quantity of these shockwaves determine the depth and intensity of compressive stresses. The ablative coating is used to protect the target surface and also to generate plasma. The ablative coating is used to protect the target surface and also to generate plasma. The laser beam shock induced deep compressive residual stresses in the compressive pre-stressed regions are generally about 50–150 KPSI (Kilo Pounds per Square Inch) extending from the laser shock peened surfaces to a depth of about 20–50 mils into the pre-stressed regions continuously The compressor blade 108 is moved while the stationary high power laser beams are fired through the curtain of flowing water 121 on the coated pressure and suction side laser shock peened surfaces 54 and 55 and forming the spaced apart laser shock peened spots. The movement is done incrementally and stopped at each location where one of the laser spots is to be formed. A controller 124 is used to modulate and control the laser shock peening system 101 to fire the laser beams on the coated surfaces in a controlled manner. Ablated coating material is washed out by the curtain of flowing water 121.

The embodiment of the method of the present invention illustrated herein includes incrementally moving the blade and firing the laser beam on the coated surface and adjacent laser shock peened spots are hit in different sequences. However, the laser beam may be moved instead just so long as relative movement between the beam and the surface is effected. Alternatively, it is contemplated that the blade can be continuously moved while continuously or incrementally firing the laser beam on the coated surface to effect laser shock peening on the fly as disclosed in U.S. Pat. No. 5,756,965, entitled "On the Fly Laser Peening".

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A method for laser shock peening leading or trailing edges of gas turbine engine blades mounted on a rotor element, said method comprising:

simultaneously laser shock peening pressure and suction side surfaces along one of the edges of the blade with circular cross-section first and second laser beams respectively, firing the first laser beam at an oblique angle with respect to the pressure side surface so as to form elliptical shaped laser spots on the pressure side surface, firing the second laser beam at about a normal angle with respect to the suction side surface so as to form circular shaped laser spots on the suction side surface, and overlapping adjacent elliptical shaped laser spots and circular shaped laser spots respectively and firing the laser beams with sufficient energy to form regions having compressive residual stresses imparted by the laser shock peening extending into the blade from the surfaces.

2. A method as claimed in claim 1 wherein the elliptical shaped laser spots have major axis extending away from the edge and over the surfaces and transverse minor axis and the elliptical shaped laser spots overlap by about 50%.

3. A method as claimed in claim 1 wherein the laser spots extend over the edge.

4. A method as claimed in claim 3 wherein relative movement between the laser beams and the surfaces is effected while the laser beams are being fired.

5. A method as claimed in claim 4 wherein the movement is linear to and at least one row of overlapping laser spots on each of the surfaces having generally equally spaced apart linearly aligned centerpoints.

6. A method for laser shock peening leading or trailing edges of gas turbine engine blades mounted on a rotor element circumscribed about an axis of rotation and having an annular space between adjacent axially spaced apart forward and aft and rows of blades, wherein the edges being laser shock peened border the space, said method comprising the following steps:

simultaneously laser shock peening pressure and suction side surfaces along one of the edges of the blades in one of the rows with circular cross-section first and second laser beams respectively, firing the first laser beam at a first oblique angle with respect to the pressure side surface so as to form elliptical shaped laser spots on the pressure side surface and at a second oblique angle with respect to the axis wherein the second oblique angle is sufficient to clear blades in the adjacent row of blades, firing the second first laser beam at about a normal angle with respect to the suction side surface so as to form circular shaped laser spots on the suction side surface and at a second oblique angle with respect to the axis wherein the second oblique angle is sufficient to clear blades in the adjacent row of blades, and overlapping adjacent elliptical shaped laser spots and firing the laser beams with sufficient energy to form regions having compressive residual stresses imparted by the laser shock peening extending into the blade from the surfaces.

7. A method as claimed in claim 6 wherein the elliptical shaped laser spots have major axis extending away from the edge and over the surfaces and transverse minor axis and the elliptical shaped laser spots overlap by about 50%.

8. A method as claimed in claim 6 wherein the laser spots extend over the edge.

9. A method as claimed in claim 7 wherein the laser spots extend over the edge.

10. A method as claimed in claim 8 wherein relative movement between the laser beams and the surfaces is effected while the laser beams are being fired.

* * * * *